Sept. 12, 1950

A. SUNDBERG 2,521,762

SAW-TOOTH OSCILLATOR

Filed Dec. 19, 1945

INVENTOR.
ALFRED SUNDBERG

BY

R P Morris
ATTORNEY

Patented Sept. 12, 1950

2,521,762

UNITED STATES PATENT OFFICE 2,521,762

SAW-TOOTH OSCILLATOR

Alfred Sundberg, New York, N. Y., assignor to Federal Telephone and Radio Corporation, New York, N. Y., a corporation of Delaware Application December 19, 1945, Serial No. 636,017

2 Claims. (Cl. 250—36)

My invention relates to oscillators, particularly to oscillators of the relaxation type for generating saw-tooth waves.

The usual saw-tooth oscillator comprises a condenser and resistor connected in series with a voltage source. The voltage across the condenser, as the condenser is gradually charged, is used as the sloping portion of the saw-tooth wave. A gas or vacuum tube is usually connected across the condenser to instantaneously discharge the condenser and terminate the rising voltage. Unfortunately, a condenser does not charge linearly with time, and straight-line voltage increases cannot be obtained.

An object of my invention is an improved relaxation oscillator.

A more specific object of my invention is a relaxation oscillator for saw-tooth waves, which will generate straight-line voltage increases on the waves.

Figure 1:
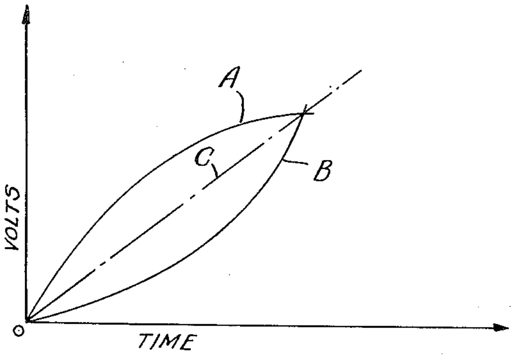
Figure 2:
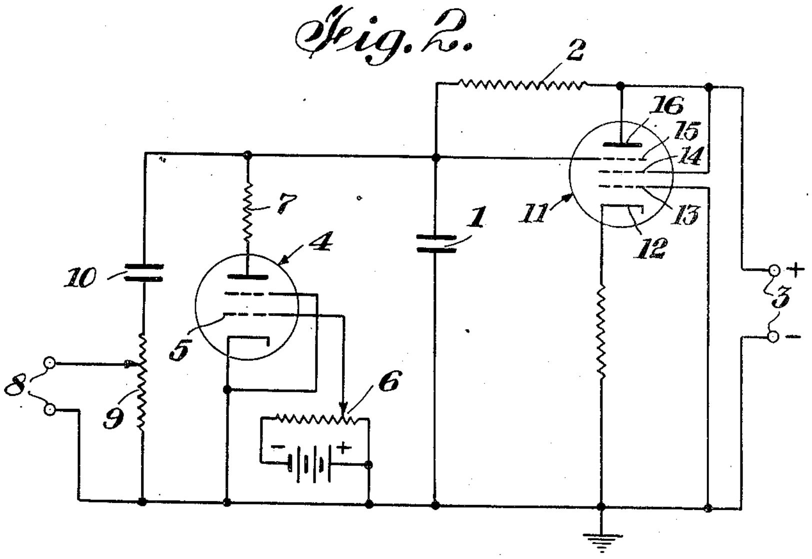
Figure 3:
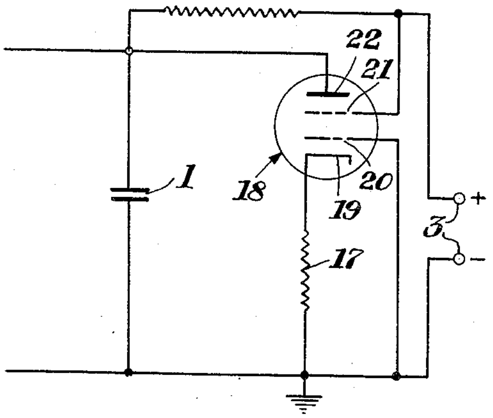

My invention is defined with particularity in the appended claims and preferred embodiments are described in the following specification and shown in the accompanying drawing in which:

Fig. 1 is a showing of voltage-time curves to better illustrate the operation of my device; and Figs. 2 and 3 are circuit diagrams of saw-tooth generators embodying my invention.

Condenser 1 and resistor 2 are connected in series with the direct current voltage source 3 for developing across the condenser the gradually increasing voltage portion of a saw-tooth wave. The time constant (CR) of the condenser and resistor determines, of course, the charging rate of and the voltage rise across the condenser. When the voltage across the condenser reaches a predetermined value, the condenser is suddenly discharged through the anode-cathode space of tube 4. The particular discharge tube shown is of the vacuum type containing a control grid 5 connected to an adjustable bias 6 for controlling the anode voltage at which discharge starts. A current limiting resistor 7 should be inserted in the anode lead. The saw-tooth wave output 8 circuit is connected as shown in parallel with the condenser 1. For adjustment of the wave amplitude, a potentiometer 9 may be used, preferably in series with coupling condenser 10.

Curve A, in Fig. 1 shows how the charge on condenser 1 increases with time. The exponential rise of voltage across the condenser is particularly objectionable in applications such as cathode ray sweep circuits where linearity is necessary for distortion-free traces. I propose, according to this invention, to make the voltage across condenser 1 change linearly with time, and to describe the principles involved, a specific embodiment of my novel circuits will be referred to. In Fig. 2 an electron discharge device 11 is shown, comprising a cathode 12, a control grid 13, a second grid 14, a third grid 15 and an anode 16. In commercial tubes, the second and the third grids are usually called, respectively, the screen and the suppressor. The anode and second grid are connected to the junction of the voltage source and the resistor 2 and the third grid to the junction of the resistor and condenser 1. The control grid and the cathode are connected to the ground side of the voltage source, a control grid biasing resistor 17 being included in the cathode lead. When operating potentials are applied, the voltage of grid 15 does not rise as expected. If resistor 2 is one megohm and tube 11 is a receiver type such as the commercial 6AK6, the voltage rise of grid 15 with time is exponential as shown by curve B, Fig. 1, and has a curvature reversed to that of a curve A. The combined characteristics of the condenser 1 and grid 15 is a substantially straight line C so that voltage variations at the junction of the condenser and grid is linear.

One generator which I constructed and which had "straight-line" saw-tooth oscillations of 30 cycles per second comprised a tube 11 corresponding to the type commercially known as 6AK6. Resistor 2 was one megohm, condenser 1 was one tenth microfarad, source 3 was 250 volts, resistor 7 was 500 ohms, tube 4 was a "2D21," condenser 10 was 0.5 microfarad, and potentiometer 9 was 0.5 megohm. The performance of the suppressor grid 15 is best demonstrated by removing the condenser 1 from the circuits. When the voltages are applied the voltage of the suppressor grid rises gradually at first and then more rapidly as shown at B, Fig. 1.

I believe the peculiar voltage characteristic of grid 15 is attributable to secondary electron emission at the grid. Grid 15 is in a high potential field established by the anode and the second grid 14, and at the beginning of the charging of condenser 1, the potential of grid 15 is relatively low in that field. Any low velocity electrons in the vicinity of grid 15 will, accordingly, be attracted to either plate 16 or grid 14. Secondary electrons from grid 15 are particularly subject to removal by the higher potential electrodes. Hence, bombardment of grid 15 with one electron which will dislodge more than one secondary electron will give the grid a net increase in positive potential. As the potential of grid 15 rises, proportionately more primary electrons strike the grid, more secondary electrons leave, and the potential rise accelerates as shown at B, Fig. 1.

Other electrodes and electrode arrangements may be used in combination with condenser 1 for obtaining the straight-line charging rate for the condenser. The essential requirement of any electron discharge tube with an electrode which will perform as grid 15, Fig. 2, is that the tube contain a positive field strong enough to remove the secondary electrons from the electrode and that it have a source of primary electrons of sufficient velocity to dislodge secondary electrons from the electrode, the secondary-to-primary ratio being greater than unity.

In Fig. 3 a tetrode 18 is shown with a cathode 19 and control grid 20 connected as in Fig. 2. The second or screen grid 21 is connected to the voltage source 3, while the anode 22 is connected to the condenser-resistor junction and serves the same purpose as grid 15 in Fig. 2. The high potential second grid 21 accelerates the electrons from the cathode some of which will pass through the second grid to the anode, and the control grid bias, of course, regulates the total space current and the number of electrons that may reach the anode. It is well known that when the screen grid voltage of a tetrode is higher than the anode voltage, the screen current will actually increase with an increase of anode voltage because of the flow of secondary electrons from the anode to the screen grid. At the beginning of the charging of condenser 1, the potential of anode 22 is relatively low and the secondary electrons, dislodged by an occasional high speed primary electron, will be drawn to the grid 21. If more electrons leave the anode than are received by it, the anode will have net increase in positive potential, and as the potential of the anode rises proportionately more primary electrons strike the anode, still more electrons are dislodged and leave, and the potential rise of the anode accelerates as shown at B, Fig. 1. With respect to the voltage source, the condenser 1 and anode 22 are in parallel and their voltage characteristics represented by A and B are combined to produce a substantially linear rise in voltage.

It will be clear that other forms of tubes providing the shunting action across the charging resistor may also be used. A triode may be used for example, or a grid controlled rectifier tube provided only that the control grid be spaced sufficiently close to the anode to be in a strong positive field.

Whereas the saw-tooth voltage of sufficient linearity to be usable from the ordinary resistor and condenser combination is limited to approximately 7 to 10 percent of the supply voltage, my invention makes it possible to use 30 to 45 of the supply voltage on a linear saw-tooth wave.

I claim:

1. A relaxation oscillator comprising a condenser, a direct voltage source, and a resistor connected in series, with the condenser and resistor being proportioned to provide a predetermined time constant; means for modifying the rate of charge of said condenser comprising an electron discharge device having a cathode and an adjacent control grid connected to the negative terminal of said source, a first electrode for establishing a high positive field, a second electrode in said field and arranged to be bombarded with electrons passed by the control grid so that secondary electrons will travel to said first electrode and increase positively the potential of said second electrode, said second electrode and said cathode being connected, respectively, to the terminals of said condenser, a biassed electron discharge device coupled across said condenser for discharging said condenser upon its attaining a given level of change.

2. A saw-tooth wave generator comprising a condenser, a resistor, and a direct voltage source connected in series; an electron discharge device having a cathode, a control grid, a screen grid, a suppressor grid and an anode; said cathode and control grid being connected to the junction of the negative terminal of the voltage source and condenser, said suppressor grid being connected to the junction of the condenser and resistor, and the anode and screen grid being connected to the junction of the positive terminal of the voltage source and resistor, a biassed electron discharge device coupled across said condenser for discharging said condenser upon its attaining a given level of change.

ALFRED SUNDBERG.

REFERENCES CITED

The following references are of record in the file of this patent:

UNITED STATES PATENTS

| Number | Name | Date |
|---|---|---|
| 1,933,219 | Nakajima et al. | Oct. 31, 1933 |
| 2,126,243 | Busse et al. | Aug. 9, 1938 |
| 2,199,278 | Black | Apr. 30, 1940 |
| 2,227,021 | Schlesinger | Dec. 31, 1940 |
| 2,232,076 | Newsam | Feb. 18, 1941 |
| 2,237,425 | Geiger et al. | Apr. 8, 1941 |
| 2,281,948 | Pieplow | May 5, 1942 |